US012547111B2

(12) United States Patent
Hirata et al.

(10) Patent No.: US 12,547,111 B2
(45) Date of Patent: Feb. 10, 2026

(54) IMAGE FORMING APPARATUS FOR MOUNTING CARTRIDGES OF DIFFERENT LIFESPANS

(71) Applicant: CANON KABUSHIKI KAISHA, Tokyo (JP)

(72) Inventors: Yuichiro Hirata, Shizuoka (JP); Takuya Oka, Kanagawa (JP); Hiroshi Kita, Shizuoka (JP); Hisashi Taniguchi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/739,770

(22) Filed: Jun. 11, 2024

(65) Prior Publication Data

US 2024/0419111 A1 Dec. 19, 2024

(30) Foreign Application Priority Data

Jun. 16, 2023 (JP) ................................ 2023-099180

(51) Int. Cl.
*G03G 15/00* (2006.01)
*G03G 15/01* (2006.01)
*G03G 21/18* (2006.01)

(52) U.S. Cl.
CPC ..... *G03G 15/5054* (2013.01); *G03G 15/0189* (2013.01); *G03G 15/553* (2013.01); *G03G 15/556* (2013.01); *G03G 21/1814* (2013.01); *G03G 21/1875* (2013.01)

(58) Field of Classification Search
CPC .......... G03G 15/0189; G03G 15/5041; G03G 15/5054; G03G 15/553; G03G 15/556; G03G 21/1814; G03G 21/1875
See application file for complete search history.

(56) References Cited

U.S. PATENT DOCUMENTS

2014/0153941 A1* 6/2014 Miyazaki .......... G03G 15/0189 399/72
2023/0008958 A1* 1/2023 Kita .................. G03G 15/5041

FOREIGN PATENT DOCUMENTS

JP 2003-270901 A 9/2003
JP 2004-045861 A 2/2004
JP 2005-326730 A 11/2005
JP 2007-241150 A 9/2007

* cited by examiner

*Primary Examiner* — Sophia S Chen
(74) *Attorney, Agent, or Firm* — Venable LLP

(57) ABSTRACT

An image forming apparatus includes a plurality of cartridges each having an image bearing member and a developer bearing member, an intermediate transfer member onto which developer images are transferred; a detection unit for outputting information related to reflected light from the developer images on the intermediate transfer member; and a control unit. The plurality of cartridges can be simultaneously installed. Each of the plurality of cartridges has a lifespan. The control unit executes image density control on the basis of a value of image data and the information related to the reflected light, and increases execution frequency of the image density control in a case where a first cartridge having a first lifespan and a second cartridge having a second lifespan different from the first lifespan are simultaneously installed.

16 Claims, 14 Drawing Sheets

IMAGE FORMING APPARATUS FOR MOUNTING CARTRIDGES OF DIFFERENT LIFESPANS

BACKGROUND OF THE INVENTION

Field of the Invention

The present invention relates to an image forming apparatus.

Description of the Related Art

A image forming apparatus of an inline color system having a configuration, in which a plurality of photosensitive drums serving as image bearing members are arranged in a rotating direction of an intermediate transfer member, has been known conventionally as an image forming apparatus such as a laser beam printer. The image forming apparatuses generally employ a process cartridge system in which an image bearing member, developing means, and a toner accommodation unit are integrated to serve as a process cartridge so as to be attachable to and detachable from an image forming apparatus body. In addition, in some cases process cartridges having a plurality of lifespan settings are prepared for such an image forming apparatus. A user selects and purchases any of a process cartridge having lifespan setting on the basis of cost or the like, and installs the same in the image forming apparatus. At that time, the user may install process cartridges having different lifespans, depending on a color.

In such an image forming apparatus, image density control (calibration) is executed according to use degrees of the process cartridge, thereby enabling execution of tinge adjustment. It is proposed in Japanese Patent Application Laid-open No. 2003-270901 that image density control is executed on the basis of results of density detection to suppress a change in image density accompanied by an increase in the number of printed sheets in an image forming apparatus of a process cartridge system, which is capable of color printing.

SUMMARY OF THE INVENTION

However, in the configuration of a conventional example as described above, tinges do not match between cartridges in a case where process cartridges having different lifespan settings are installed in the same image forming apparatus. This is because the timing of image density control for the process cartridges varies depending on the lifespan settings, resulting in a deviation of the timing of the image density control when the process cartridges having different lifespans are simultaneously installed.

The present invention has been made in view of the above problem. The present invention has an object of providing a technology to execute image density control at an appropriate timing in an image forming apparatus in which a plurality of cartridges having different lifespans are capable of being simultaneously installed.

The present invention provides an image forming apparatus comprising:

a plurality of cartridges each having an image bearing member, a developer bearing member, and an accommodation chamber, the image bearing member being exposed on a basis of image data so as to have an electrostatic latent image formed on a surface thereof, the developer bearing member developing the electrostatic latent image by developer so as to form a developer image, the accommodation chamber accommodating the developer, an intermediate transfer member onto which the developer images formed by the plurality of cartridges are transferred;

a detection unit for applying light to the developer images transferred onto the intermediate transfer member and detecting reflected light and outputting information related to the reflected light; and a control unit, wherein the plurality of cartridges is able to be simultaneously installed in the image forming apparatus, each of the plurality of cartridges has an available lifespan, and the control unit is configured to:

execute image density control to control image density for forming the developer images on a basis of a value of the image data and the information related to the reflected light, and increase, in a case where a first cartridge having a first lifespan and a second cartridge having a second lifespan different from the first lifespan are simultaneously installed in the image forming apparatus, execution frequency of the image density control relative to that in a case where only the second cartridge is installed.

The present invention also provides an image forming apparatus comprising:

a plurality of cartridges each having an image bearing member, a developer bearing member, and an accommodation chamber, the image bearing member being exposed on a basis of image data so as to have an electrostatic latent image formed on a surface thereof, the developer bearing member developing the electrostatic latent image by developer so as to form a developer image, the accommodation chamber accommodating the developer, an intermediate transfer member onto which the developer images formed by the plurality of cartridges are transferred;

a detection unit for applying light to the developer images transferred onto the intermediate transfer member and detecting reflected light and outputting information related to the reflected light; and a control unit, wherein the plurality of cartridges is attachable and detachable to the image forming apparatus, each of the plurality of cartridges has an available lifespan, the control unit is configured to execute image density control to control image density for forming the developer images on a basis of a value of the image data and the information related to the reflected light, and execute, in a case where a first cartridge having a first lifespan and a second cartridge having a second lifespan different from the first lifespan are simultaneously installed in the image forming apparatus, the image density control at both a first frequency determined to execute the image density control for the first cartridge and a second frequency determined to execute the image density control for the second cartridge.

According to the present invention, it is possible to provide a technology to execute image density control at an appropriate timing in an image forming apparatus in which a plurality of cartridges having different lifespans are capable of being simultaneously installed.

Further features of the present invention will become apparent from the following description of exemplary embodiments with reference to the attached drawings.

DESCRIPTION OF THE EMBODIMENTS

Figure 1:
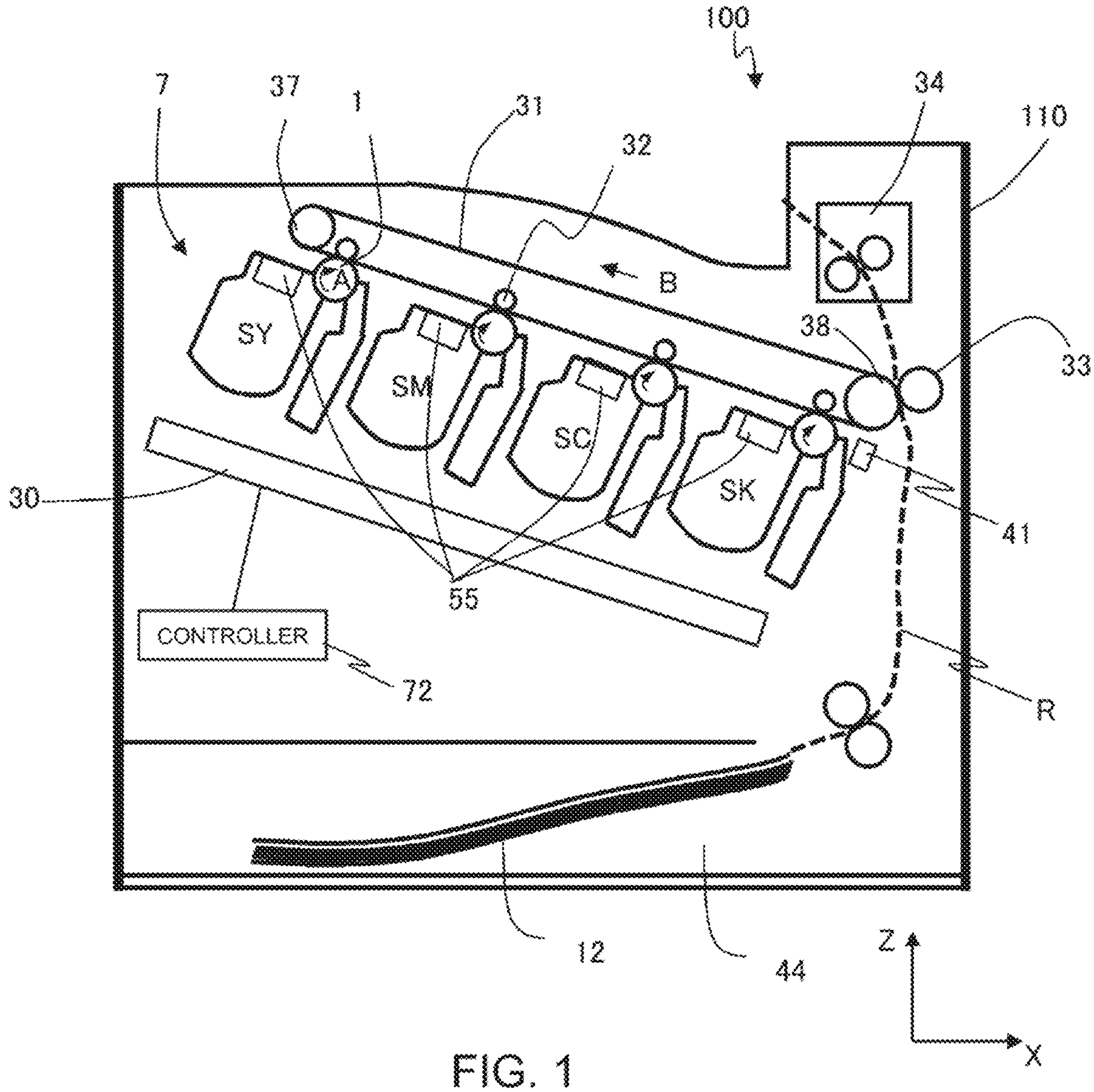
FIG. 1 is a schematic configuration cross-sectional view of an image forming apparatus in a first embodiment.

Hereinafter, preferred embodiments of the present invention will be exemplarily described in detail with reference to the drawings. However, dimensions, materials, shapes, their relative arrangements, or the like of constituting components mentioned in the embodiments are not intended to limit the scope of the invention unless otherwise particularly mentioned. Further, materials, shapes, or the like once described in preceding descriptions will be the same also in subsequent descriptions unless otherwise particularly mentioned again. Particularly for configurations or processes that will not be shown in figures or described, general or publicly-known technologies in the technical field concerned are applicable. Further, duplicated descriptions will be omitted depending on cases.

First Embodiment

First, the entire configuration of an electrophotographic image forming apparatus 100 will be described with reference to the schematic cross-sectional view of FIG. 1. The image forming apparatus 100 of the present embodiment is a full-color laser printer employing an in-line system and an intermediate transfer system. The image forming apparatus 100 is capable of forming full-color images on recording materials 12 (for example, recording sheets) according to image information. The image information is input to an image forming apparatus body 110 from a host apparatus such as a personal computer (PC 120) communicably connected to the image forming apparatus body 110 and an image reading apparatus connected to the image forming apparatus body 110.

The image forming apparatus 100 has first to fourth image forming units SY, SM, SC, and SK for forming images of respective colors yellow (Y), magenta (M), cyan (C), and black (K) as a plurality of image forming units. In the present embodiment, the first to fourth image forming units SY, SM, SC, and SK are arranged in a line along an intermediate transfer belt 31. Note that each of image forming units SY, SM, SC, and SK is assumed to include a primary transfer roller 32 and a process cartridge 7.

Note that the configurations and operations of the first to fourth image forming units are substantially the same except for the colors to be formed by the image forming units in the present embodiment. Accordingly, subscripts Y, M, C, and K added to symbols to express elements provided corresponding to the respective colors will be omitted and comprehensively described when there is no need to particularly distinguish the elements from each other.

Figure 2:
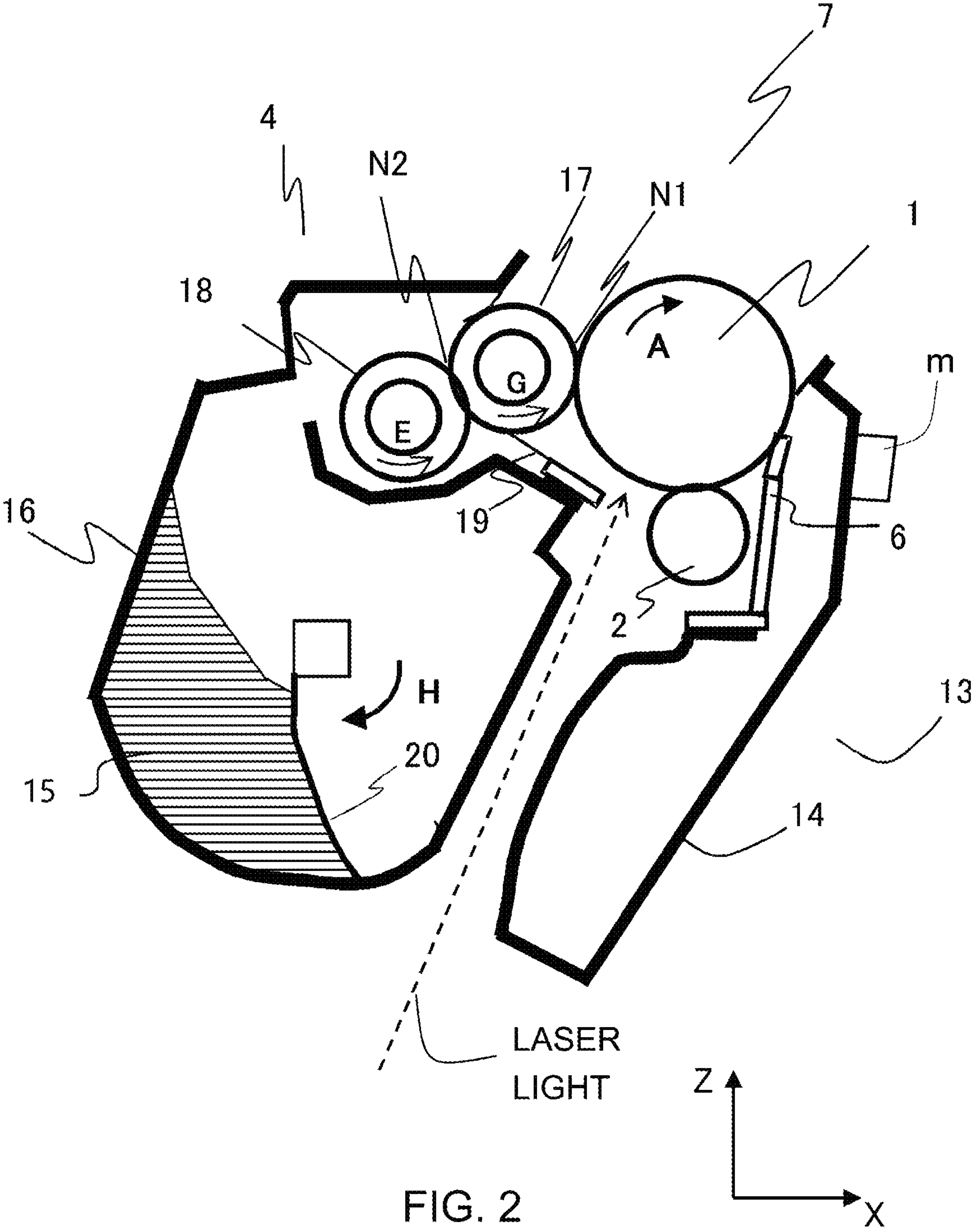
FIG. 2 is a schematic configuration cross-sectional view of a developing apparatus and a process cartridge in the first embodiment.
Figure 3:
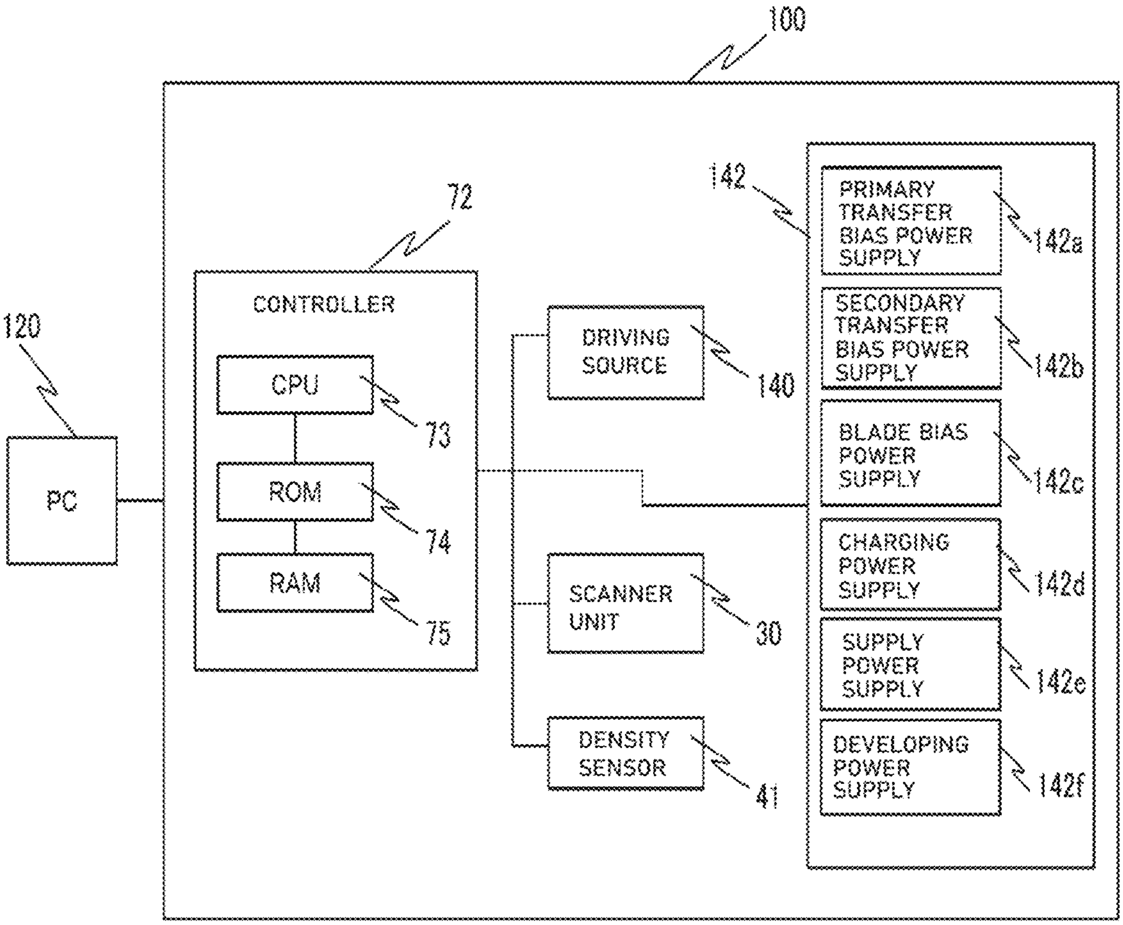
FIG. 3 is a diagram showing control blocks of the image forming apparatus in the first embodiment.

In the present embodiment, the image forming apparatus 100 has four photosensitive drums 1 arranged along the intermediate transfer belt 31 as a plurality of image bearing members. FIG. 2 is a schematic cross-sectional view of a process cartridge 7 in a longitudinal direction (rotational axis direction) of a photosensitive drum 1. The four photosensitive drums 1 have the same configurations. Further, FIG. 3 is a block diagram showing control blocks of the image forming apparatus 100.

The photosensitive drum 1 is rotationally driven by a driving source 140 serving as a driving unit in an arrow A direction (clockwise direction in FIG. 2). A charging roller 2 (charging member) serving as a charging unit that uniformly charges a surface of the photosensitive drum 1 is arranged around the photosensitive drum 1. Further, a developing roller 17 and a cleaning blade 6 are also arranged around the photosensitive drum 1. The developing roller 17 is a developing unit that develops an electrostatic latent image as a toner image, and constitutes a developing unit 4 serving as a developing apparatus. The cleaning blade 6 is a cleaning unit that removes toner (untransferred toner) residual on the surface of the photosensitive drum 1 after a transfer process. The cleaning blade 6 is in contact with the surface of the photosensitive drum 1, and this contact spot will be defined as a contact portion. The process cartridge 7 will be described in further detail later. The recording materials 12 are loaded in a recording material holding unit 44, transported on a transport path R by a pickup roller, and reach between a secondary transfer roller 33 and a secondary transfer facing roller 38.

In the present embodiment, the photosensitive drum 1, the charging roller 2 serving as a process unit that acts on the photosensitive drum 1, the developing unit 4, and the cleaning blade 6 are integrated into a cartridge to form the process cartridge 7. The process cartridge 7 is made attachable to and detachable from the image forming apparatus 100. In the present embodiment, main constituting elements of the process cartridges 7 for the respective colors have the same shapes. The process cartridges 7 for the respective colors differ from each other in that they each accommodate toner of the respective colors yellow (Y), magenta (M), cyan (C), and black (K).

Process Cartridge

The entire configuration of the process cartridge 7 attachable to the image forming apparatus 100 of the present embodiment will be continuously described. Note that the basic configurations and operations of the process cartridges 7 for the respective colors are the same except for types (colors) of accommodated developer in the present embodiment. The process cartridge 7 has a photosensitive member unit 13 including the photosensitive drum 1 or the like and the developing unit 4 including the developing roller 17 or the like.

The photosensitive member unit 13 has a cleaning frame body 14 as a frame body that supports various elements inside the photosensitive member unit 13. The photosensitive drum 1 is rotatably attached to the cleaning frame body 14 via a bearing (not shown). When a driving force of a driving motor serving as the driving source 140 is transmitted to the photosensitive member unit 13, the photosensitive drum 1 is rotationally driven in the arrow A direction (clockwise direction) according to an image forming operation. In the present embodiment, an organic photosensitive member in which an undercoating layer, a carrier generation layer, and a carrier transfer layer serving as function films are sequentially coated on an outer peripheral surface of an aluminum cylinder is used as the photosensitive drum 1 that plays a central role in an image forming process.

Further, the cleaning blade 6 and the charging roller 2 are arranged in the photosensitive member unit 13 so as to be in contact with an outer peripheral surface of the photosensitive drum 1. Untransferred toner removed from the surface of the photosensitive drum 1 by the cleaning blade 6 falls due to gravity and is accommodated in the cleaning frame body 14.

The charging roller 2 serving as a charging unit is driven to rotate by bringing a roller portion of its conductive rubber into pressure contact with the photosensitive drum 1. Here, a prescribed DC voltage is applied from a charging power supply **142*d* to a cored bar of the charging roller 2 in a charging process, whereby a uniform dark potential (Vd) is formed on the surface of the photosensitive drum 1. A spot pattern of laser light emitted corresponding to image data by the laser light from a scanner unit 30 exposes the photosensitive drum 1. At an exposed area, surface charges disappear due to carriers from the carrier generation layer, and a potential reduces. As a result, an electrostatic latent image is formed on the photosensitive drum 1**, where exposed areas have a prescribed bright potential (Vl), while unexposed areas have a prescribed dark potential (Vd).

Meanwhile, the developing unit 4 includes the developing roller 17 (developer bearing member), a developing blade 19, a toner supply roller 18 (supply unit), toner 15, and a toner accommodation chamber 16 serving as an accommodation chamber for the toner 15. As the toner 15 of the present embodiment, nonmagnetic mono-component spherical toner that negatively charges as a regular polarity and has a particle diameter of 7 μm is used. Further, silica particles having a particle diameter of 20 nm are added to a surface of the toner 15 as toner additives (external additive particles).

The developing blade 19 is in counter-contact with the developing roller 17. The developing blade 19 controls a coated amount of toner supplied by the toner supply roller 18, and applies charges to the toner. The developing blade 19 is made of a thin plate-shaped member. The developing blade 19 forms a contact pressure by making use of the spring elasticity of the thin plate, and its surface comes in contact with the toner 15 and the developing roller 17. The toner 15 is charged by friction when the developing blade 19 and the developing roller 17 rub against each other, whereby charges are applied to the toner 15. At the same time, the thickness of a toner layer is controlled. Further, in the present embodiment, a prescribed voltage is applied from a blade bias power supply to the developing blade 19 to stabilize a coated amount of the toner.

The developing roller 17 and the photosensitive drum 1 rotate such that their mutual surfaces move in the same direction (the photosensitive drum 1 rotates in the arrow A direction, and the developing roller 17 rotates in an arrow G direction) at a facing portion N1 (contact portion). In the present embodiment, with respect to a prescribed DC voltage applied from a developing power supply **142*f* to the developing roller 17, the toner 15 negatively charged by friction transfers only to a bright potential portion to visualize an electrostatic latent image due to a potential difference at the facing portion N1 at which the developing roller 17 comes in contact with the photosensitive drum 1**.

The toner supply roller 18 is disposed with a prescribed nip portion N2 formed on a peripheral surface of the developing roller 17. The toner supply roller 18 rotates in an arrow E direction (counterclockwise direction in FIG. 2). The toner supply roller 18 of the present embodiment is an elastic sponge roller in which a foaming body is formed on an outer periphery of a conductive cored bar. The toner supply roller 18 and the developing roller 17 are in contact with each other at a prescribed penetration amount, and rotate such that they mutually move in opposite directions at the nip portion N2. By this rotating operation, supply of the toner to the developing roller 17 by the toner supply roller 18 and removal of the untransferred toner residual on the developing roller 17 are performed.

Inside the toner accommodation chamber 16, a toner stirring member 20 is provided. The toner stirring member 20 includes a sheet-shaped member that rotates in an arrow H direction, and transports the toner 15 to an upper portion of the toner supply roller 18 while stirring the toner 15 accommodated in the toner accommodation chamber 16. Note that both the developing roller 17 and the toner supply roller 18 have an outer diameter of q 20, and a penetration amount of the toner supply roller 18 into the developing roller 17 is set at 1.5 mm in the present embodiment. In the present embodiment, a prescribed DC bias is applied from the developing power supply **142*f* to the developing roller 17, and the toner is transferred only to a bright potential portion due to a potential difference at a developing portion at which the developing roller 17 comes in contact with the photosensitive drum 1**, thereby visualizing an electrostatic latent image.

The process cartridge 7 has a memory m made up of a non-volatile memory or the like. In the memory m, information related to determination of an execution frequency of image density control by a controller 72 is stored. Here, the information related to the determination of the execution frequency of the image density control includes, for example, a nominal lifespan, a toner filling amount, at least one of the roughness and hardness of the charging roller 2, information related to the layer structure of the charging roller 2, at least one of the coarseness and hardness of the developing roller 17, at least one of the material, film thickness, and susceptibility to light degradation of a surface layer of the photosensitive drum 1, or the like. Further, a calibration frequency set in advance for the cartridge may be stored. Note that the memory m is configured to be capable of communicating with the controller 72 serving as a control unit of the image forming apparatus 100 shown in FIG. 1 in a non-contact manner or in a contact manner through an electric contact. That is, the controller 72 is capable of reading information from the memory m and writing information into the memory m. Note that the memory m is attached to the photosensitive member unit 13 in FIG. 2 but may be attached to the developing unit 4. Further, memories m may be attached to both the photosensitive member unit

13 and the developing unit 4. In this case, information related to the photosensitive drum 1 or the charging roller 2 is stored in a memory m on the side of the photosensitive member unit 13, while information related to the developing roller 17 or the toner 15 is stored in a memory m on the side of the developing unit 4.

Here, in the present embodiment, a plurality of cartridges having different lifespan settings are assumed as the process cartridges 7 of the respective colors. Here, the lifespans of the process cartridges 7 refer to numeric values expressing the available periods of the cartridges, and are typically set according to toner capacities. In a case where the lifespans are set on the basis of the number of printed sheets, the number of sheets printable when typical images are printed using the toner accommodated in the process cartridges 7 may be set as the lifespans, or numeric values with some margins may be set as the lifespans. Further, the lifespans are typically expressed by the number of sheets of printable recording materials, but may be expressed by other units based on used hours of the process cartridges 7 such as used days and the number of used hours. The process cartridges 7 have nominal lifespans set by a manufacturer. Here, two types of the process cartridges 7, i.e., relatively short-life process cartridges 7 each having a nominal lifespan of 10,000 sheets and relatively long-life process cartridges 7 each having a nominal lifespan of 50,000 sheets are assumed.

Further, as shown in FIG. 1, the image forming apparatus 100 includes a scanner unit 30 serving as an exposure unit (exposure apparatus) that applies laser light onto the photosensitive drums 1 on the basis of image information to form electrostatic latent images. In addition, the image forming apparatus 100 includes the intermediate transfer belt 31 serving as an intermediate transfer member that transfers toner images on the photosensitive drums 1 onto the recording material 12 while facing the four photosensitive drums 1.

As shown in FIG. 1, the intermediate transfer belt 31 made of an endless belt comes in contact with all the photosensitive drums 1, and rotates (moves) in an arrow B direction (counterclockwise direction in FIG. 1). The intermediate transfer belt 31 is stretched over between a driving roller 37, the secondary transfer facing roller 38, and a driven roller (not shown) serving as a plurality of support members. On the side of an inner peripheral surface of the intermediate transfer belt 31, four primary transfer rollers 32 serving as primary transfer units (transfer members) are arranged side by side in a line so as to face the respective photosensitive drums 1. Further, a bias having a polarity opposite to the regular charging polarity of the toner is applied from a primary transfer bias power supply to the primary transfer rollers 32. Thus, the toner images on the photosensitive drums 1 are transferred onto the intermediate transfer belt.

In addition, the secondary transfer roller 33 serving as a secondary transfer unit is arranged at a position facing the secondary transfer facing roller 38 on the side of an outer peripheral surface of the intermediate transfer belt 31. Further, a bias having a polarity opposite to the regular charging polarity of the toner is applied from a secondary transfer bias power supply to the secondary transfer roller 33. Thus, toner images on the intermediate transfer belt 31 are transferred onto the recording material 12.

Note that the image forming apparatus 100 includes a power supply 142 as shown in FIG. 3. The power supply 142 functions as the primary transfer bias power supply and the secondary transfer bias power supply described above or a blade bias power supply that will be described later according to instructions from the controller 72. In the example of FIG. 3, the one power supply 142 functions also as a primary transfer bias power supply 142*a*, a secondary transfer bias power supply 142*b*, a blade bias power supply 142*c*, the charging power supply 142*d* that applies a voltage to the charging roller 2, a supply power supply 142*e* that applies a voltage to the toner supply roller 18, and the developing power supply 142*f* that applies a voltage to the developing roller 17. However, a power supply configuration is not limited to this, and a separate power supply apparatus may be provided for each of members.

First, the surfaces of the photosensitive drums 1 are uniformly charged by the charging rollers 2 during an image formation. Next, electrostatic latent images corresponding to image information are formed on the photosensitive drums 1 by laser light corresponding to the image information emitted from the scanner unit 30. Then, developer is supplied to the electrostatic latent images by the developing units 4, and the electrostatic latent images are developed on the photosensitive drums as toner images (developer images). Next, the developed toner images are transferred (primarily transferred) onto the intermediate transfer belt 31 by an operation of the primary transfer rollers 32.

For example, when a full-color image is formed, the above processes are successively performed in the first to fourth image forming units SY, SM, SC to SK, and toner images of the respective colors are superimposed one upon another on the intermediate transfer belt 31, whereby toner images of the four colors are formed. Then, the toner images of the four colors on the intermediate transfer belt 31 are collectively and secondarily transferred onto a recording material 12. In addition, the toner images are fixed onto the recording material 12 as a fixing apparatus 34 applies heat and pressure to the recording material 12.

Note that primarily untransferred toner residual on the photosensitive drums 1 after the primary transfer process is removed and collected by cleaning blades 6. Further, secondarily untransferred toner residual on the intermediate transfer belt 31 after the secondary transfer process is cleaned by an intermediate transfer belt cleaning apparatus (not shown).

As illustrated in FIG. 3, the image forming apparatus 100 includes the controller 72. The controller 72 is an information processing apparatus including computation resources such as a CPU 73, a ROM 74, and a RAM 75, and functions as a control unit that operates according to instructions through a touch panel of a PC 120 or the image forming apparatus body 110. The controller 72 controls, for example, respective constituting elements inside the image forming apparatus such as the driving source 140 like a motor, the power supply 142, the scanner unit 30, and a density sensor 41.

Figure 4:
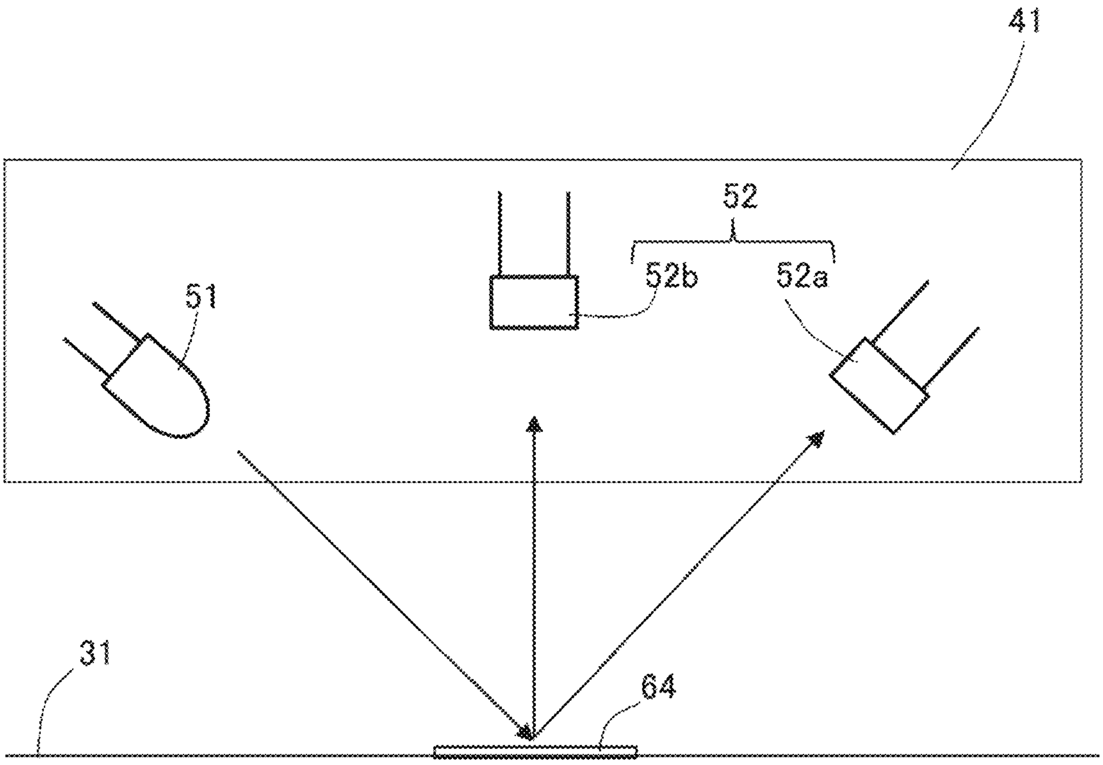
FIG. 4 is a configuration diagram of a density sensor.

The image forming apparatus 100 of the present embodiment includes the density sensor 41 as a detection unit. The density sensor 41 is an optical sensor that detects a toner amount, and is employed in image density control as a calibration process. The density sensor 41 is arranged so as to face the intermediate transfer belt 31 as shown in FIG. 1. The density sensor 41 measures intensity information related to reflected light corresponding to the density of toner patches formed on a surface of the intermediate transfer belt 31. An example of the configuration of the density sensor 41 is shown in FIG. 4. The density sensor 41 has a light-emitting element 51, a light-receiving element 52 (a first light-receiving element 52*a* and a second light-receiving element 52*b*), and a processing circuit (not shown) such as an IC that processes light-receiving data, and is configured to accommodate these elements in a holder. The density sensor 41 is configured to be capable of transmitting and receiving information to and from the controller 72. As the light-emitting element 51, an infrared light-emitting element such as an LED is, for example, available. As the light-receiving element 52, a photodiode, a Cds cell, or the like is, for example, available.

The light-emitting element 51 applies light toward the intermediate transfer belt 31. The first light-receiving element 52*a* detects the intensity of regularly-reflected light from a toner patch 64, and the second light-receiving element 52*b* detects the intensity of irregularly-reflected light from the toner patch 64. By detecting both the intensity of the regularly-reflected light and the intensity of the irregularly-reflected light, the density sensor 41 is capable of detecting the density of the toner patch 64 from high density to low density. Note that it is also possible to use an optical element such as a lens (not shown) to couple the light-emitting element 51 and the light-receiving element 52 together.

Further, the intermediate transfer belt 31 is a polyimide single-layer resin belt having a peripheral length of 880 mm in the present embodiment. Further, an appropriate amount of carbon fine particles is dispersed inside a resin to adjust the resistance of the belt, and a surface color of the belt is black. Moreover, the surface of the intermediate transfer belt 31 has high smoothness and glossiness, and the glossiness is about 100% (measured by a glossmeter IG-320 manufactured by HORIBA, Ltd.).

The density sensor 41 detects reflected light mainly with the first light-receiving element 52*a* in a case where the surface of the intermediate transfer belt 31 is exposed (a toner amount is zero). This is because the surface of the intermediate transfer belt 31 has glossiness as described above. On the other hand, in a case where toner images are formed on the intermediate transfer belt 31, an output of regular reflection gradually reduces with an increase in the density (toner amount) of the toner images. This is because regularly-reflected light from the surface of the belt reduces when the surface of the intermediate transfer belt 31 is covered up by toner.

Figure 5:
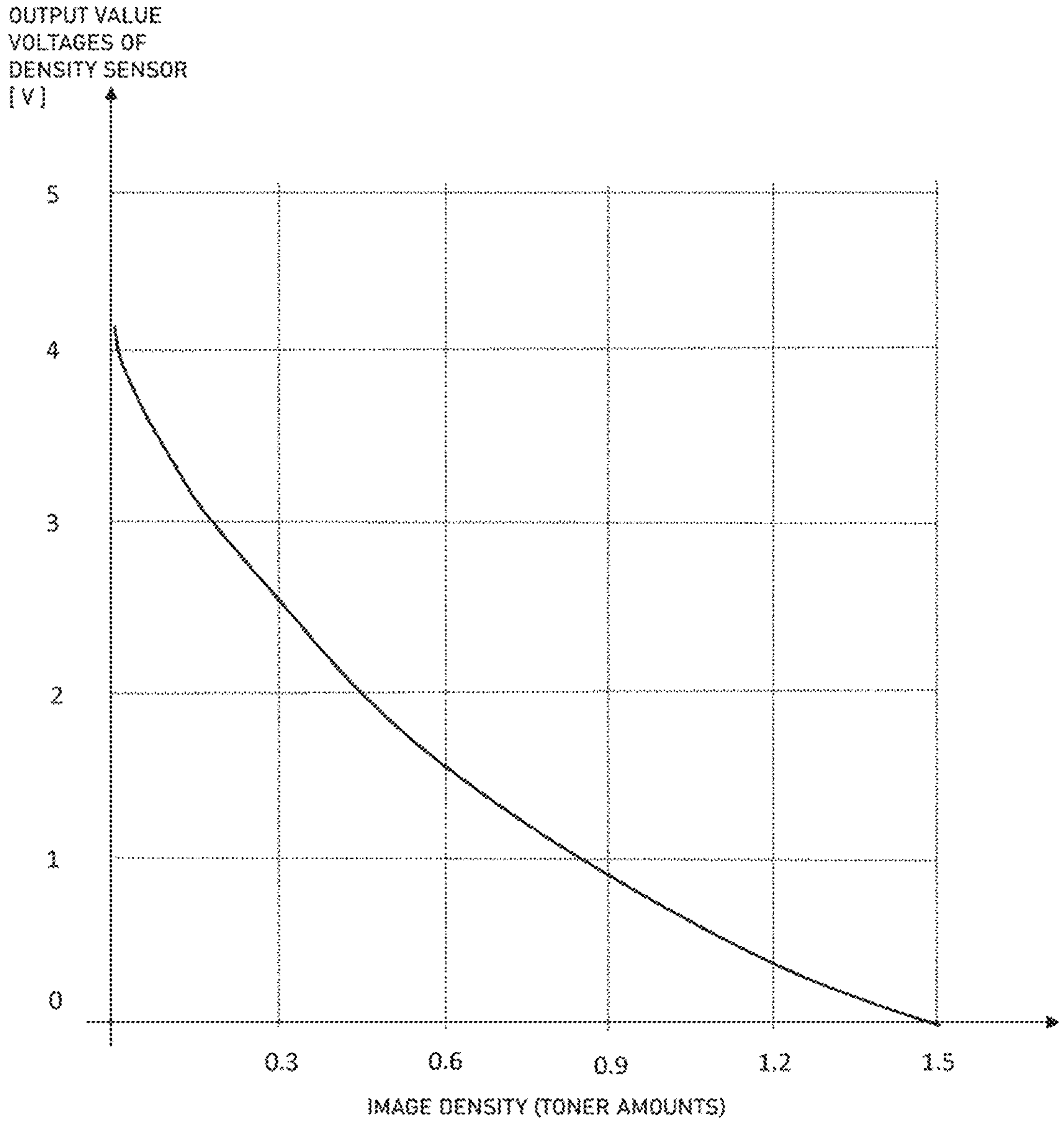
FIG. 5 is an explanatory diagram of density sensor characteristics.
Figure 6:
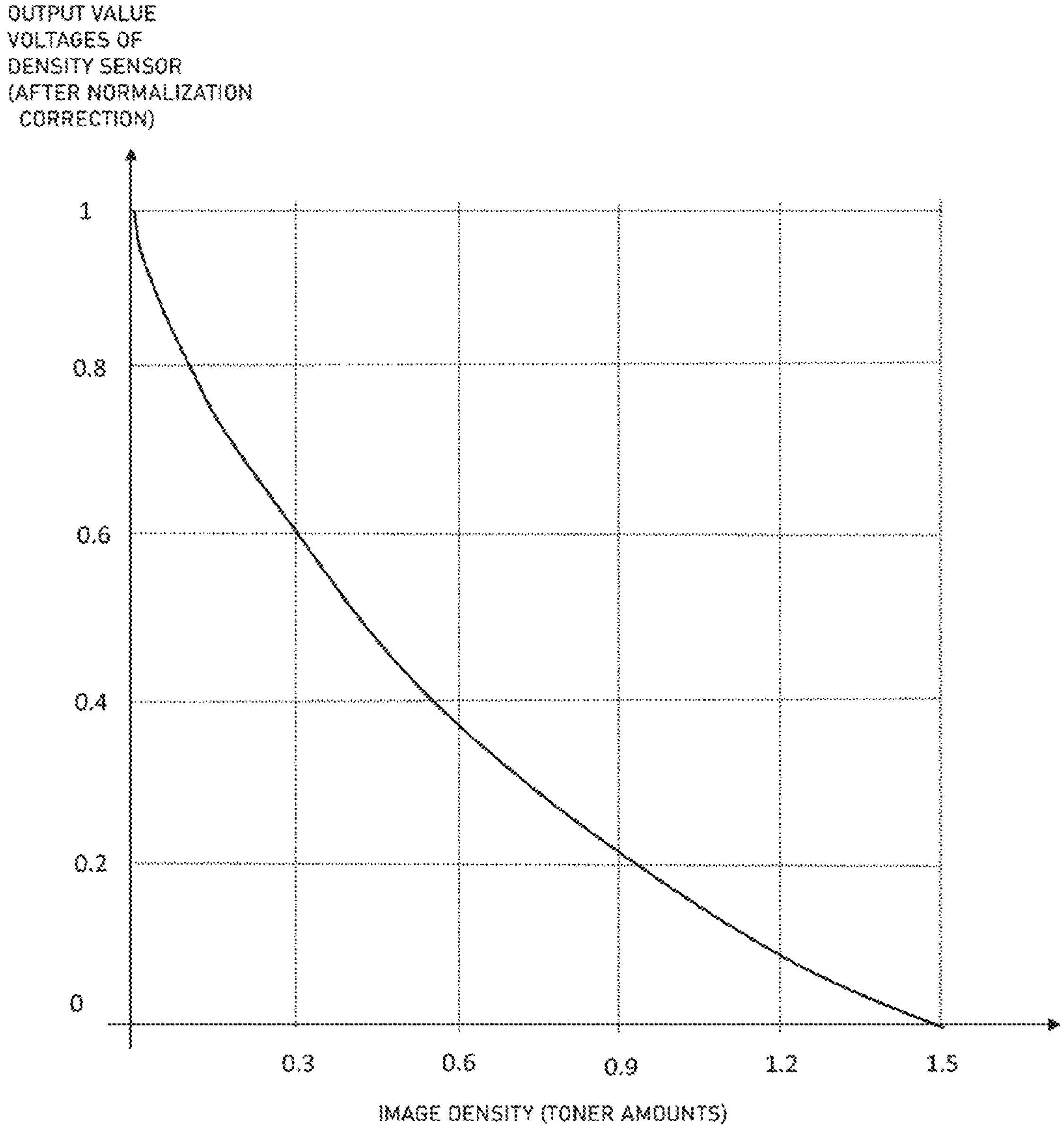
FIG. 6 is a normalization correction explanatory diagram of a density sensor output.

FIG. 5 is a graph showing the relationship between detected values of the density sensor 41 and toner amounts. Here, detected values corresponding to an output of regular reflection are shown. In FIG. 5, a vertical axis shows output value voltages of the density sensor 41, and a horizontal axis shows image density (corresponding to toner amounts). Note that the density sensor 41 employed in the present embodiment has a maximum output value voltage of 5 V. In the image forming apparatus 100 of the present embodiment, an output of the density sensor 41 is corrected using an output value (base output value) of the intermediate transfer belt 31 where toner is not present. Specifically, an output value of a toner patch is normalized by a base output value (output value where image density is zero in FIG. 5) of an intermediate transfer member (toner patch output/base output). Sensor output characteristics after normalization are shown in FIG. 6. By the normalization, the same correction is enabled even in a case where the glossiness of the intermediate transfer belt 31 reduces due to stains, scratches, or the like.

The above method for correcting a toner patch output to be normalized using a base output is a known method, and has been employed in many color image forming apparatuses put on the market. Note that any existing configuration for density detection is available as the density sensor 41. Further, the wavelength of light is not limited to infrared light.

Image Density Control Operation Common to Respective Embodiments

Figure 7:
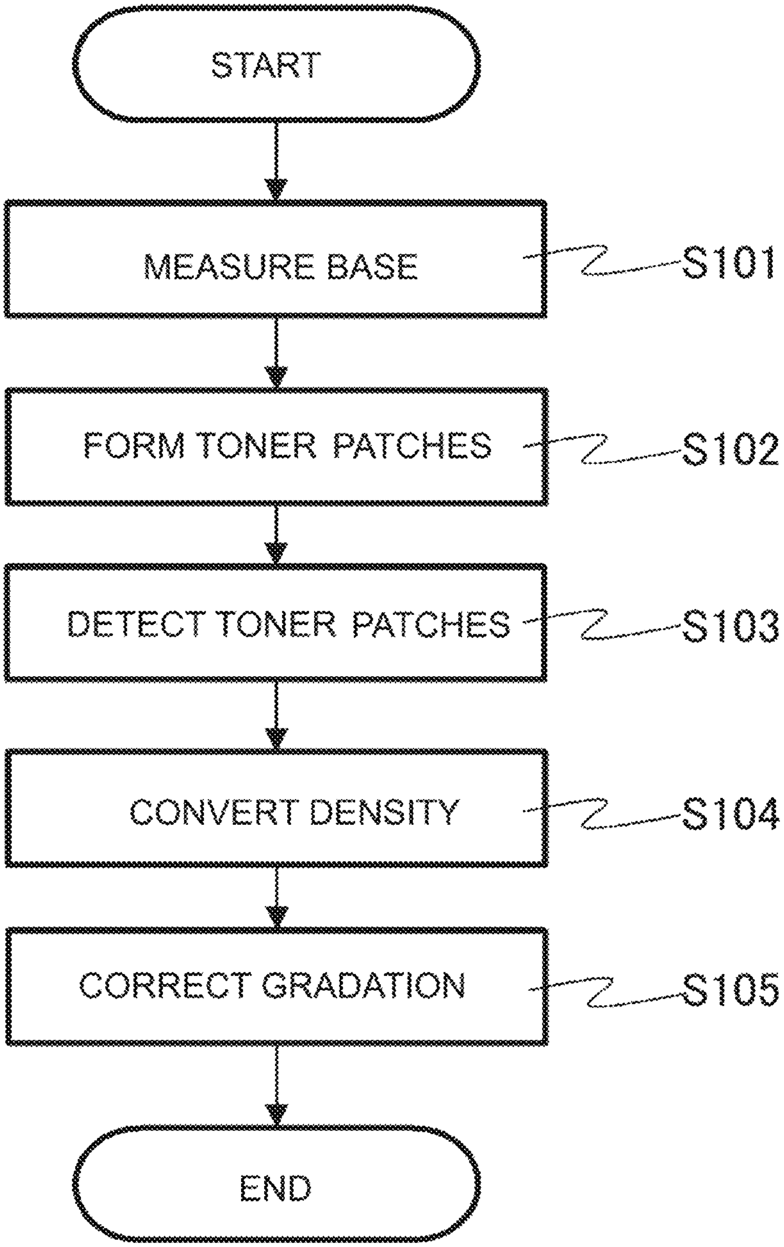
FIG. 7 is a flowchart of an image density control method.

Next, image density control in respective embodiments will be described using the flowchart of FIG. 7.

Note that the image density control in the image forming apparatus 100 of the present invention refers to image gradation control to adjust the density gradation characteristics of an image. In a flow, respective steps are executed by the controller 72 with reference to an output value of the density sensor 41 or the like.

Image Density Control

The image density control is executable at any timing. That is, the image density control may be executed periodically, or may be executed when a variation in image density is expected. In the present embodiment, the timing of the image density control is appropriately controlled also at installation of the plurality of process cartridges having different lifespans. First, in step S101, measurement of a base of the intermediate transfer belt 31, that is, measurement of density in a state in which toner is not placed is executed. At this time, the controller 72 rotates and moves the intermediate transfer belt 31 by the driving source 140 to cause prescribed measurement positions that are density measurement targets in the intermediate transfer belt 31 to sequentially fall within a measurement range of the density sensor 41. The measurement positions and the number of points are made to correspond to toner patches used in the image density control.

Figure 8:
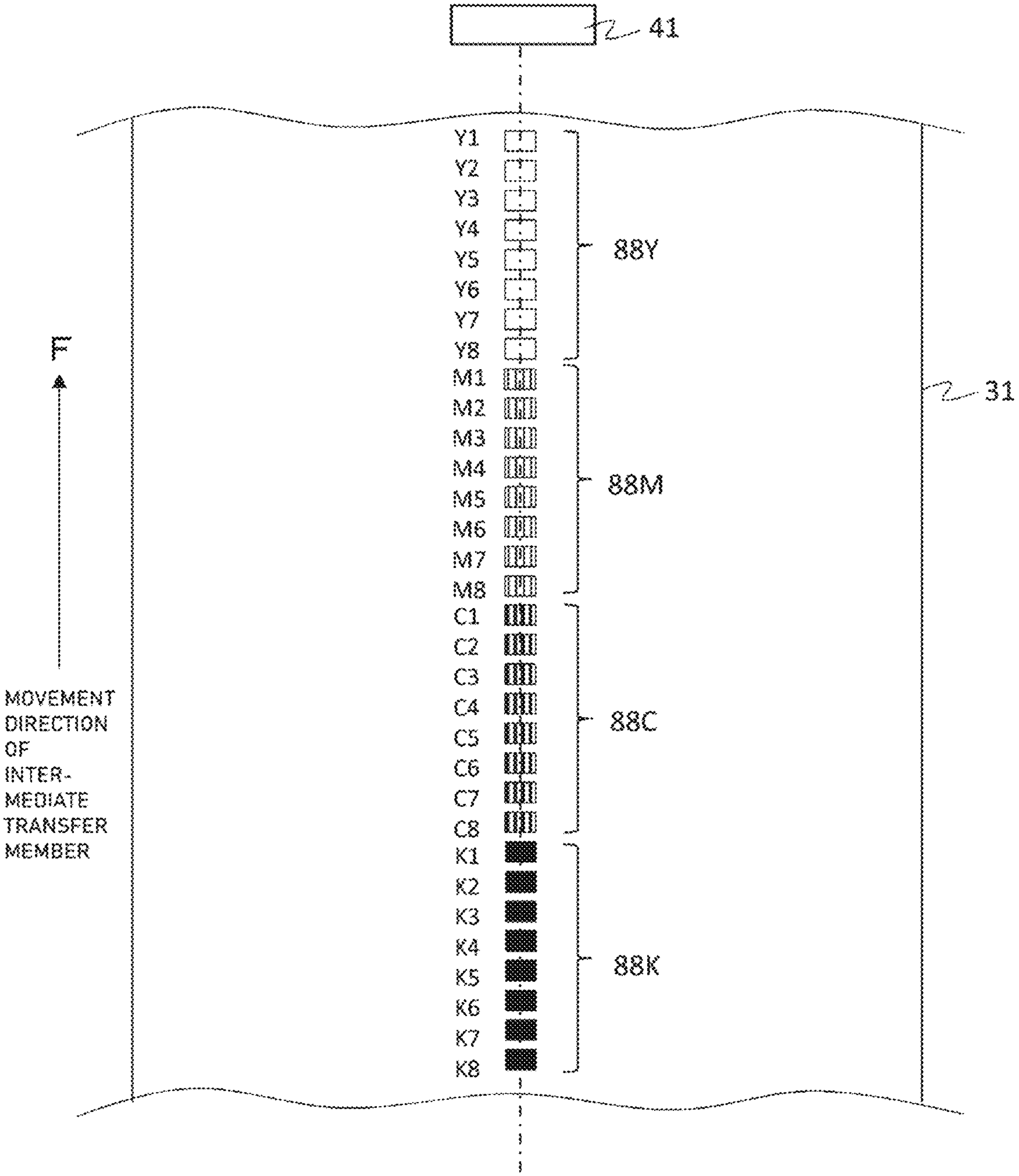
FIG. 8 is an explanatory diagram of a patch pattern on an intermediate transfer belt.

Here, FIG. 8 shows a patch pattern formed on the intermediate transfer belt 31. A plurality of 8-mm square patches 88 are arranged at an interval of 2 mm at positions corresponding to an arrangement spot of the density sensor 41 along a movement direction (arrow F) of the intermediate transfer belt 31. The patches 88 include yellow patches 88Y, magenta patches 88M, cyan patches 88C, and black patches 88K. Each of the patches 88Y to 88K of the respective colors includes eight patches (that will be simply mentioned as Y1 to Y8, M1 to M8, C1 to C8, and K1 to K8 below) with image printing ratios (density gradation degrees) varied in eight stages. As a result, a total of 32 patches 88 are formed on the intermediate transfer belt 31.

The corresponding relationships between the respective patches 88 and the printing ratios (gradation degrees) are set as follows.

Y1, M1, C1, K1=12.5%
Y2, M2, C2, K2=25%
Y3, M3, C3, K3=37.5%
Y4, M4, C4, K4=50%
Y5, M5, C5, K5=62.5%
Y6, M6, C6, K6=75%
Y7, M7, C7, K7=87.5%
Y8, M8, C8, K8=100%

The measurement of the base of the intermediate transfer belt 31 is executed with respect to formed positions of the above 32 patches 88 before the patches 88 are formed. For example, the measurement of the base may be executed one cycle before the patches 88 are formed.

Further, as will be described later, the respective patches 88 may be printed in a monochrome color only, and monochrome image density control may be executed.

Referring back to FIG. 7, the controller 72 rotates the intermediate transfer belt 31 by the driving source 140 of the image forming apparatus 100, and sequentially moves the respective patch formed positions to positions facing the image forming units in step S102. Then, the toner patches 88 are formed as described in FIG. 8 on the intermediate transfer belt 31 by controlling the image forming units.

Next, in step S103, the controller 72 causes the patch formed positions on the intermediate transfer belt 31 to sequentially fall within the measurement range of the density sensor 41, and detects reflected light amounts from the toner patches 88 using the density sensor 41. Then, in step S104, the controller 72 calculates the density of the toner patches 88. At this time, output values of the density of the toner patches 88 are normalized using base output values of the intermediate transfer belt 31 (toner output/base output). The normalization of the patch output is executed for all the patches 88 using the base output values acquired at the positions corresponding to the patches. Next, the controller 72 converts the normalized values into density values according to a density conversion table. The density conversion table is stored in advance in the ROM 74.

Next, in step S105, the controller 72 executes image gradation control (gradation correction). The image gradation control will be described using FIG. 9. Note that gradation correction only for cyan will be described here, but correction is executed in the same way for magenta, yellow, and black as well.

Figure 9:
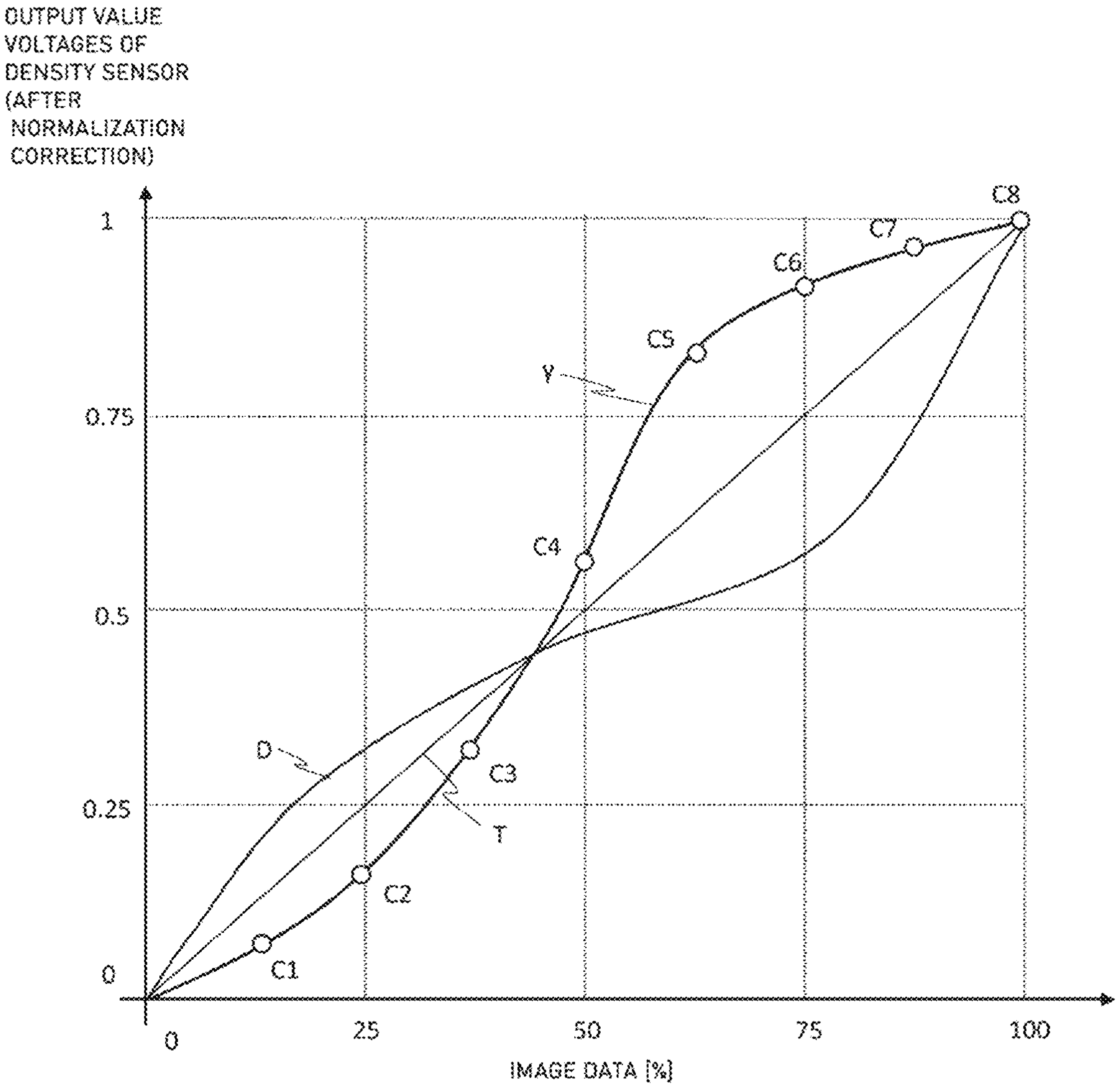
FIG. 9 is an explanatory diagram of image gradation control.

In FIG. 9, a horizontal axis shows image data (for example, pixel value %), and a vertical axis shows density detected values (values of output value voltages after normalization correction) of the density sensor 41. Further, o marks in FIG. 9 show detected density values of the density sensor 41 corresponding to the respective patches C1, C2, C3, C4, C5, C6, C7, and C8. Further, a curved line γ passing through respective points of the patches C1 to C8 shows density gradation characteristics in a state in which density control (gradation correction control) is not executed. Note that the controller 72 performs, for image density at gradation at which patches are not formed, spline interpolation to pass through the respective points of an origin and the patches C1 to C8 to calculate image data values.

Next, a straight line T shows target density gradation characteristics of the image density control. In the present embodiment, the target gradation characteristics T are set so as to have the direct proportionality between image data and density. Note that the gradation characteristics are not limited to a straight line. It is clear from the comparison between the curved line γ and the straight line T that, when gradation correction is not executed in the illustrated example, printing is executed such that the image density becomes low with respect to the image data values in a range in which the image data values are low, while printing is executed such that the image density becomes high with respect to the image data values in a range in which the image data values are high. That is, printing is executed by tinge different from one desired by a user.

Further, a curved line D shows a gradation correction table calculated in the control of the present embodiment. The controller 72 calculates the gradation correction table D by finding out symmetrical points of the gradation characteristics γ before correction with respect to the target gradation characteristics T. The calculated gradation correction table D is stored in the RAM 75.

When forming a print image, the controller 72 is enabled to achieve target gradation characteristics by correcting values of image data while referring to the gradation correction table D. For example, in a range in which image data values are low, the image data values are corrected to be high by using the gradation correction table D. By determining control values of the image forming apparatus 100 with the corrected image data values, it is possible to increase printing image density to raise the gradation characteristics up to the straight line T. Further, a method for executing the image density control here may be a known method for controlling image forming conditions. The image forming conditions include, for example, a developing condition for a developing bias or the like and a charging condition for a charging bias or the like. The controller 72 forms a plurality of prescribed pattern (such as halftone pattern) patches on the intermediate transfer belt 31 by changing the image forming conditions in multiple stages, detects the density of the pattern patches, and calculates image forming conditions that achieve desired density.

Figure 10:
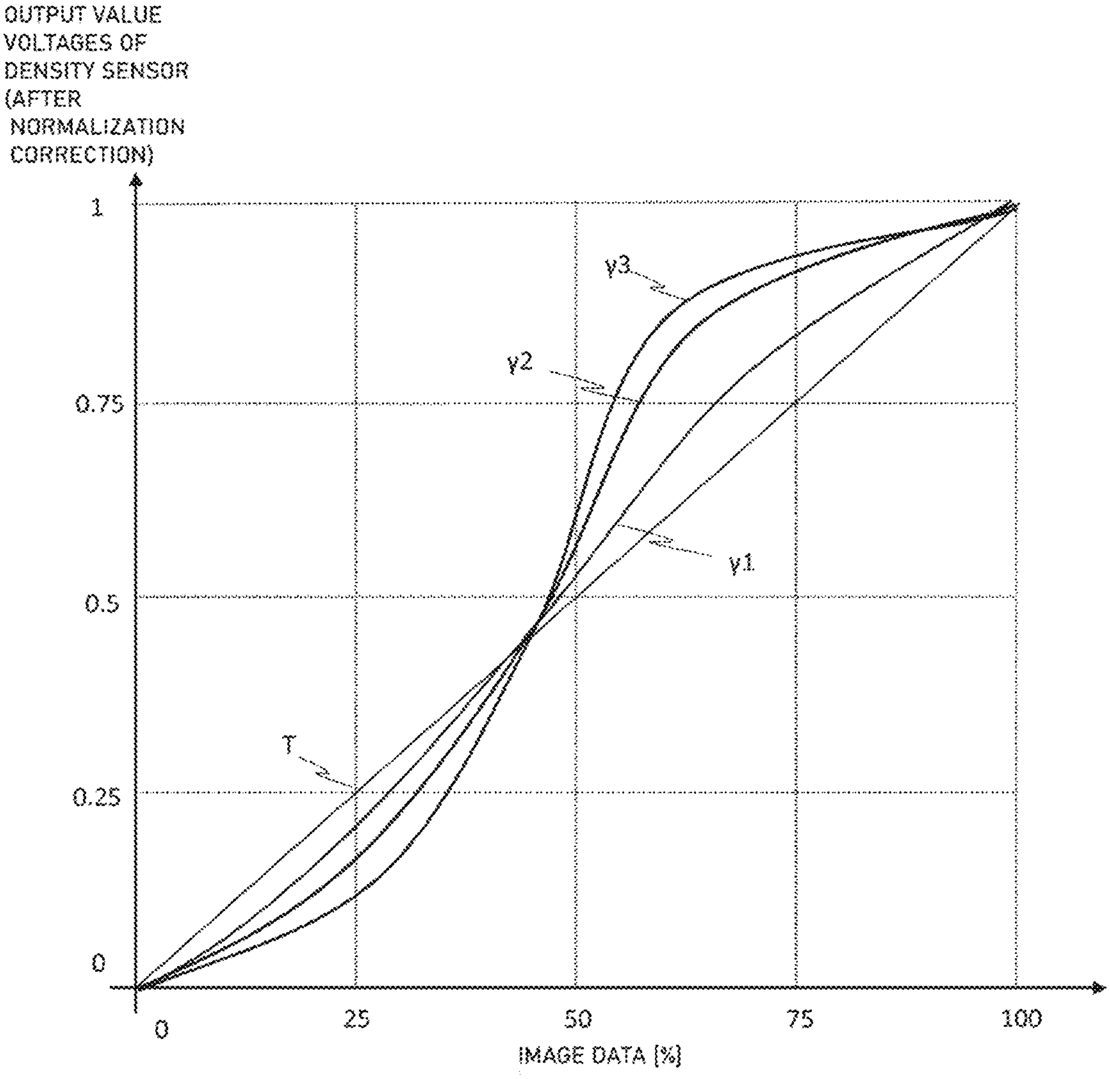
FIG. 10 is an explanatory diagram of the transition of a curved line γ.

Next, the transition of the curved line γ at printing will be described using FIG. 10. Immediately after the image density control is executed according to the above flow, image data values are corrected using the above gradation correction table D, whereby the relationship between the image data values and the image density becomes the straight line T. However, a deviation of the density gradation becomes greater as the number of printed sheets increases, and the curved line γ transitions in the sequence of γ1→γ2→γ3. Here, it is assumed that the deviation of the density gradation is allowable up to the curved line γ2 but a transition to the curved line γ3 exceeds a prescribed allowable range. In a case where the curved line γ2 falls within the allowable range, the image density control is executed at the timing when the deviation becomes the curved line γ2, and tinge reproduction is enabled by restoring the curved line γ2 to the straight line T. The above describes the image density control (image gradation correction) in the present embodiment.

Execution Frequency of Image Density Control

In the present embodiment, a process cartridge having a nominal lifespan of 10,000 sheets (that will be called a Type 1 or a first process cartridge 7*a* below; the first process cartridge 7*a* has a first lifespan) and a process cartridge having a nominal lifespan of 50,000 sheets (that will be called a Type 2 or a second process cartridge 7*b*; the second process cartridge 7*b* has a second lifespan longer than the first lifespan) are assumed as the process cartridges 7 having different lifespans.

In the present embodiment, each of the Type 1 and the Type 2 has a different filling amount for the toner 15. Specifically, the cartridge of the Type 2 has a greater filling amount for the toner 15 than the cartridge of the Type 1. First, the cartridge of the Type 1 having a relatively short lifespan is employed. The transition of the curved line γ after execution of the image density control at a certain timing is shown in Table 1.

TABLE 1

| The number of printed sheets after execution of image density control | Transition of curved line γ |
|---|---|
| 0 Sheet | T |
| 500 Sheets | γ1 |
| 1000 Sheets | γ2 |

That is, in the case of the process cartridge of the Type 1, the curved line γ immediately after the image density control becomes the targeted straight line T, and becomes the curved line γ2 when 1,000 sheets have been printed. Therefore, it is possible to maintain tinge reproduction by executing the image density control every time 1,000 sheets have been printed (that is, for every 1,000 sheets) at a maximum. Here, the timing when the image density control is executed has to be immediately before the curved line γ exceeds the allowable range at the latest. In the case of the Type 1 of the present embodiment, the timing corresponds to the time when 1,000 sheets have been printed.

Next, the Type 2 having a relative long lifespan is employed. The transition of the curved line γ after execution of the image density control at a certain timing is shown in Table 2.

TABLE 2

| The number of printed sheets after execution of image density control | Transition of curved line γ |
|---|---|
| 0 Sheet | T |
| 1000 Sheets | γ1 |
| 2000 Sheets | γ2 |

That is, in the case of the cartridge of the Type 2, the curved line γ immediately after the image density control becomes the targeted straight line T, and becomes the curved line γ2 when 2,000 sheets have been printed. Therefore, it is possible to maintain tinge reproduction by executing the image density control every time 2,000 sheets have been printed (that is, for every 2,000 sheets) at a maximum. Here, for example, assuming that the Type 1 is defined as a first cartridge, the execution frequency (1,000 sheets) of the image density control may be called a first frequency. Further, assuming that the Type 2 is defined as a second cartridge, the execution frequency (2,000 sheets) of the image density control may be called a second frequency.

This is because the Type 2 has a greater toner filling amount, leading to differences in the transition of a toner particle diameter, toner degradation, and a developing roller filming level compared to the Type 1. As a result, a transition amount of the curved line γ becomes smaller.

Figure 11:
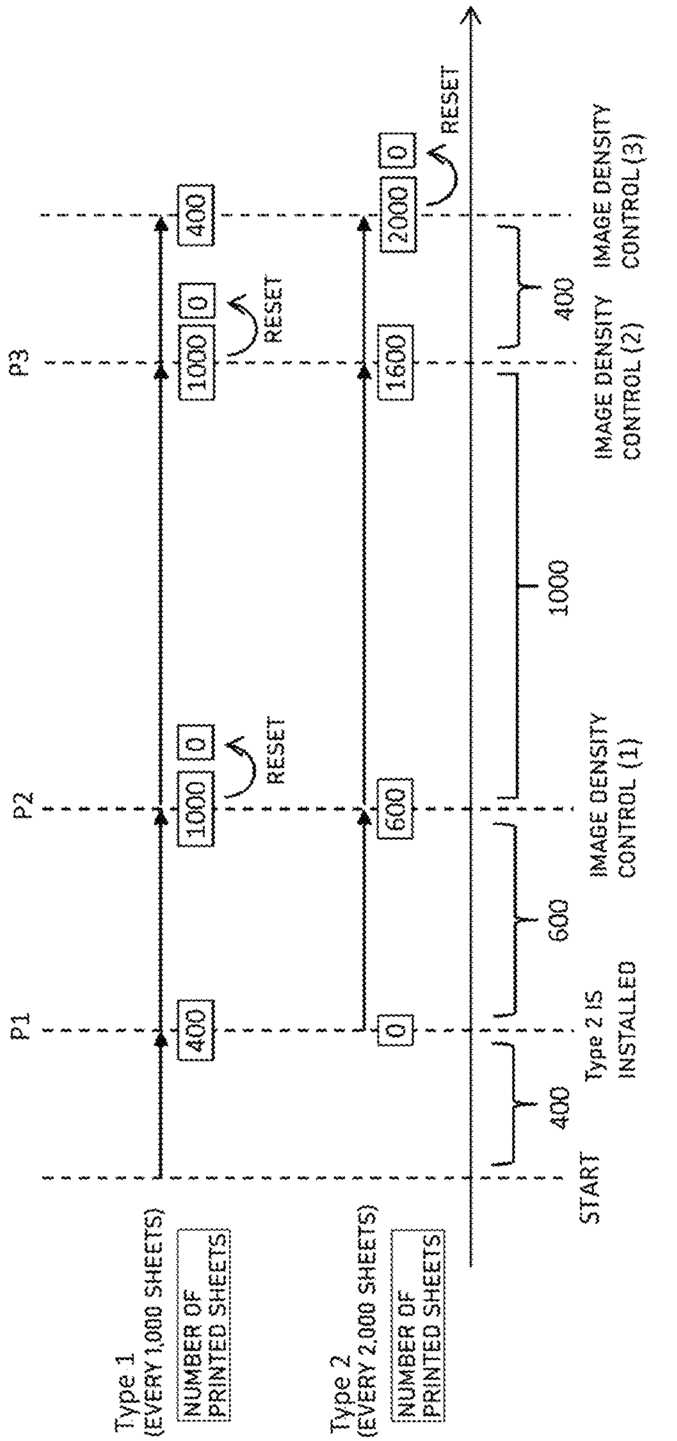
FIG. 11 is a timing chart showing an example of image density control.

In a case where the Type 1 and the Type 2 coexist, that is, in a case where cartridges having different lifespan settings are provided in the same image forming apparatus as in the present embodiment, the image density control is executed at both the timing when 1,000 sheets have been printed for the Type 1 and the timing when 2,000 sheets have been printed for the Type 2. When it is assumed that monochrome image density control is executed only for the Type 1 or the Type 2 at each timing of the Type 1 and the Type 2, the image density control transitions as shown in FIG. 11 that will be described below. Thus, in a case where the Type 1 and the Type 2 coexist, the total execution frequency of the image density control for both the Type 1 and the Type 2 is increased to a greater extent compared to a case where one of the Types is selected, thereby making it possible to reproduce more accurate tinges.

An example of the control of the present embodiment will be described with reference to FIG. 11. In FIG. 11, numbers surrounded by frames in each of the Type 1 and the Type 2 show the number of printed sheets since calibration (or installation) at the last time. The numbers are reset to zero for every 1,000 sheets in the case of the Type 1, and reset to zero for every 2,000 sheets in the case of the Type 2. It is assumed that the Type 2 that is brand new is installed at a timing P1 when 400 sheets have been printed since a start. In this case, as the number of printed sheets of the Type 1 reaches 1,000 sheets at a timing P2 when 600 sheets have been printed since the installation of the Type 2, the image density control is executed for the first time. Subsequently, as the number of printed sheets after reset of the Type 1 reaches 1,000 sheets at a timing P3 when 1,000 sheets have been printed since the timing P2, the image density control is executed for the second time. Subsequently, as the number of printed sheets of the Type 2 reaches 2,000 sheets at a timing P4 when 400 sheets have been printed since the timing P3, the image density control is executed for the third time. As described above, it is possible to increase the number of calibration times in the control of the present embodiment.

Note that the prescribed number of sheets (2,000 sheets) of the Type 2 is twice the prescribed number of sheets (1,000 sheets) of the Type 1 in the case of the present embodiment. Therefore, there could be a case that the image density control is consequently executed at the same timing (for every 1,000 sheets) due to their overlapping cycles. However, in this case, the image density control is executed for both cartridges of the Type 1 and the Type 2 at necessary timings without exception.

Figure 12:
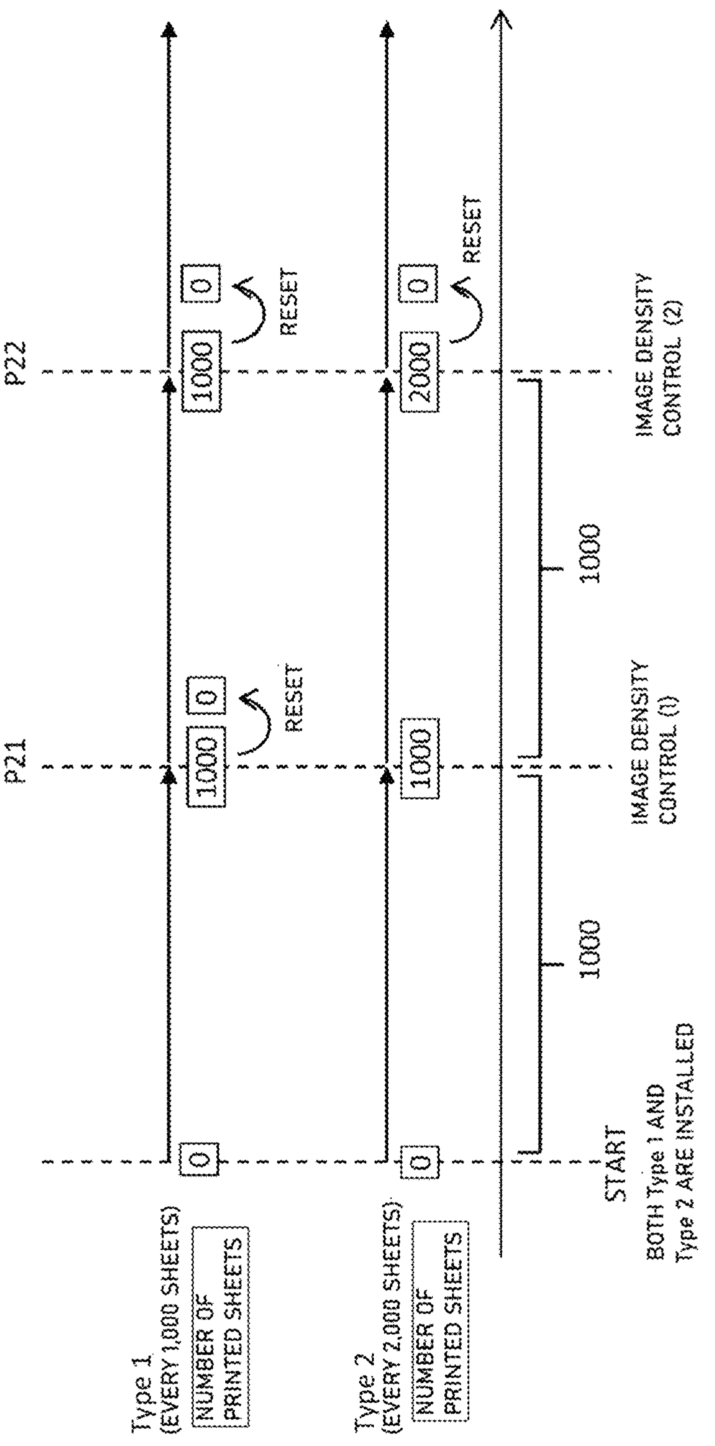
FIG. 12 is a timing chart showing another example of the image density control.

An example of the control of this case will be described with reference to FIG. 12. In this example, it is assumed that the timing when the Type 1 and the Type 2 have been simultaneously installed is set as a start. As the number of printed sheets of the Type 1 reaches 1,000 sheets at a timing P21 when 1,000 sheets have been printed since the start, the image density control is executed for the first time. Subsequently, as the number of printed sheets after reset of the Type 1 reaches 1,000 sheets and when the number of printed sheets of the Type 2 reaches 2,000 at a timing P22 when 1,000 sheets have been printed since the timing P21, the image density control is executed for the second time. In a case where the cycles of the Type 1 and the Type 2 overlap each other as described above, calibration is executed for every 1,000 sheets as in the case of the Type 1. However, in this case as well, calibration may be executed at both a timing for the Type 1 and a timing for the Type 2.

Note that the image density control is periodically executed in the present embodiment but may be non-periodically executed according to the timing when the curved line transitions to the curved line γ2. Further, the image density control may also be executed at the timing when instructions are received from a user. Further, an execution timing may be determined using tag information stored in the memories m of the process cartridges 7. Further, calibration is executed only for a process cartridge of a corresponding color in the present embodiment, but may be executed for both the Type 1 and the Type 2 using one of the Type 1 and the Type 2 as a trigger.

Further, in the invention of the present application, for both of the Type 1 and Type 2 a calibration execution request is controlled to be executed at the timing when the curved line transitions to the curved line γ2, that is, at the timing when the deviation of the density gradation falls within the allowable range. However, the control of the invention of the present application is not limited to the above timing, and may only be executed before the curved line γ transitions to the curved line γ2 from the straight line T, that is, during a period in which the deviation of the density gradation falls within the allowable range.

Further, a timing based on a state of the curved line γ may be changed between the Type 1 and the Type 2. Note that it is preferable to make a calibration execution request before the curved line γ transitions from γ1 to γ2. For example, a case where toner of the Type 1 degrades faster than toner of the Type 2 and the curved line γ of the Type 1 deviates to a greater extent to cause a remarkable density change will be considered on the basis of the comparison between the Type 1 and the Type 2. In this case, control may be made such that the Type 1 executes the image density control at the timing when the curved line γ becomes the curved line γ1, and such that the Type 2 executes the calibration at the timing when the curved line γ becomes the curved line γ2. Like this, the Type 1 may be controlled to execute the image density control at the timing when the curved line γ less changes compared to the Type 2. Note that in a case where the toner of the Type 2 degrades faster than that of the Type 1 or the like, the Type 2 may be controlled to execute the image density control at the timing when the curved line γ less changes compared to the Type 1 as a matter of course. Further, the timing of the image density control may be changed according to environment changes such as printing conditions, temperature, and humidity. The timing of the image density control may be appropriately set according to the lifespans of the process cartridges, that is, the degradation degree of the toner.

Further, in the invention of the present application, the next image density control is controlled to be executed on the basis of number of printed sheets for each of the Type 1 and the Type 2 after execution of the image density control. However, the execution timing of the image density control is not limited to this, and may only be based on parameter information related to the toner. For example, parameters related to degradation of the toner such as a rotating hour, a rotating number, and a surface movement distance of a developing roller may be used. Further, the image density control is controlled to be executed on the basis of a prescribed number of printed sheets, but may be executed on the basis of a percentage. For example, the image density control may be controlled to be executed for the first time when the lifespan of a cartridge has reached 99% relative to a nominal lifespan (the cartridge is brand new at 100%, and reaches the end of the lifespan at 0%), and may be executed for the second time when the lifespan has reached 95%. Parameters may be appropriately set such that a calibration frequency is changed as a product reaches the end of a lifespan.

Further, calibration may be absolutely executed for all cartridges at the timing when a brand new cartridge has been installed.

Second Embodiment

Next, a second embodiment of the present invention will be described. Note that descriptions will be omitted for parts overlapping with the first embodiment. In the present embodiment, a process cartridge having a nominal lifespan of 10,000 sheets (that will be called a Type 1 below like the first embodiment) and a process cartridge having a nominal lifespan of 50,000 sheets (that will be called a Type 3 below) are assumed as process cartridges having different lifespans. Accordingly, the nominal lifespan of the Type 3 is the same as that of the Type 2 of the first embodiment. The Type 1 and the Type 3 differ not only in a toner filling amount but also in a charging roller 2. The Type 3 employs a long-life compatible charging roller 2, and has higher roughness than the Type 1.

Like the first embodiment, a curved line γ after execution of image density control of the process cartridge of the Type 1 transitions as shown in Table 1. Next, in the process cartridge of the Type 3 a curved line γ after execution of image density control at a certain timing transitions as shown in Table 3.

TABLE 3

| The number of printed sheets after execution of image density control | Transition of curved line γ |
|---|---|
| 0 Sheet | T |
| 550 Sheets | γ1 |
| 1100 Sheets | γ2 |

That is, in the case of the Type 3, the curved line γ immediately after execution of the image density control becomes a targeted straight line T, and becomes a curved line γ2 when 2,400 sheets have been printed. Therefore, it is possible to maintain tinge reproduction by executing the image density control every time 2,400 sheets have been printed. This is because the Type 3 has a greater toner filling amount and has the charging roller 2 with higher roughness, leading to reduced influence of stains on the charging roller 2 and a slower reduction in a drum potential after charging compared to the Type 1.

In a case where the Type 1 and the Type 3 coexist like the present embodiment, the image density control is executed at both the timing when 1,000 sheets have been printed for the Type 1 and the timing when 2,400 sheets have been printed for the Type 3. Thus, in the case where the Type 1 and the Type 3 coexist, the execution frequency of the image density control is increased to a greater extent compared to a case where one of the Types is selected, thereby making it possible to reproduce more accurate tinges.

Figure 13:
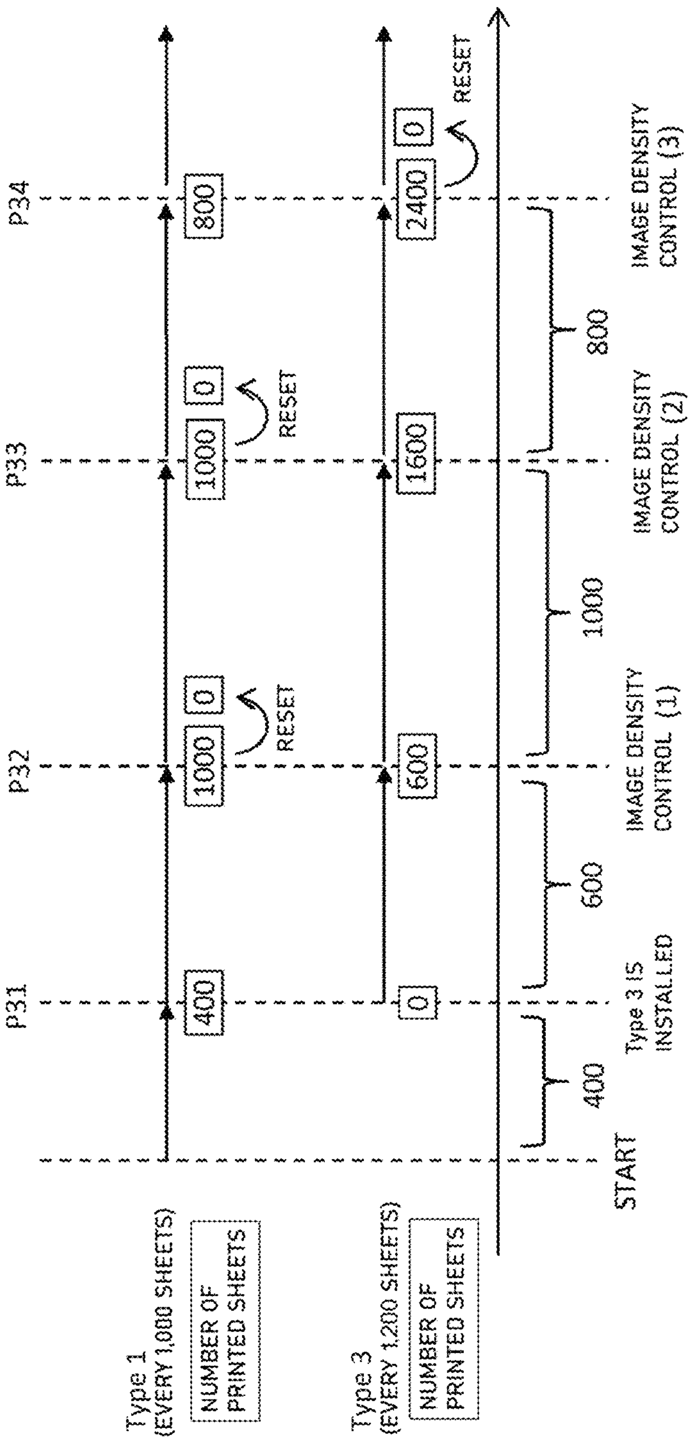
FIG. 13 is a timing chart showing an example of image density control of a second embodiment.

An example of the control of the present embodiment will be described with reference to FIG. 13. In FIG. 13, numbers surrounded by frames in each of the Type 1 and the Type 3 show the number of printed sheets since calibration (or installation) at the last time. The numbers are reset to zero for every 1,000 sheets in the case of the Type 1, and reset to zero for every 2,400 sheets in the case of the Type 3. It is assumed that the Type 3 that is brand new is installed at a timing P31 when 400 sheets have been printed since a start. In this case, as the number of printed sheets of the Type 1 reaches 1,000 sheets at a timing P32 when 600 sheets have been printed since the installation of the Type 3, the image density control is executed for the first time. Subsequently, as the number of printed sheets after reset of the Type 1 reaches 1,000 sheets at a timing P33 when 1,000 sheets have been printed since the timing P32, the image density control is executed for the second time. Subsequently, as the number of printed sheets of the Type 3 reaches 2,400 sheets at a timing P34 when 800 sheets have been printed since the timing P33, the image density control is executed for the third time. As described above, it is possible to increase the number of calibration times in the control of the present embodiment.

Note that the image density control is periodically executed in the present embodiment but may be non-periodically executed according to the timing when the curved line transitions to the curved line γ2. Further, an execution timing may be determined using tag information stored in memories m of process cartridges 7.

First Modified Example

Next, a first modified example of the second embodiment will be described. In the first modified example as well, the cartridge of the Type 1 and the cartridge of the Type 3 having a nominal lifespan of 50,000 sheets are employed like the second embodiment. As for the transition of the curved line γ as well, the image density control is executed for every 2,400 sheets in the Type 3 like Table 3.

In the present modified example, the Type 1 and the Type 3 differ not only in a toner filling amount but also in the layer structure of a charging roller 2. That is, the Type 1 has a charging roller 2 having a single-layer structure (having only a base layer without a surface layer), and the Type 3 has a long-life compatible charging roller 2 having a two-layered structure (having a surface layer and a base layer).

The cartridge of the Type 3 of the present modified example has a greater toner filling amount, and reduces stains on the charging roller 2 to a greater extent compared to the charging roller 2 having the single-layer structure of the Type 1 since the surface layer of the charging roller 2 is coated. As a result, a reduction in a drum potential after charging becomes slower compared to the Type 1, and therefore the transition of the curved line γ also becomes slower. In a case where the Type 1 and the Type 3 coexist, the image density control is executed at both the timing when 1,000 sheets have been printed for the Type 1 and the timing when 2,400 sheets have been printed for the Type 3. Thus, the execution frequency of the image density control is increased, thereby making it possible to reproduce more accurate tinges.

Further, the image density control is periodically executed in the present embodiment but may be non-periodically executed according to the timing when the curved line transitions to the curved line γ2. Further, an execution timing may be determined using tag information stored in the process cartridges.

Second Modified Example

In a second modified example as well, the cartridge of the Type 1 and the cartridge of the Type 3 having a nominal lifespan of 50,000 sheets are employed. As for the transition of the curved line γ as well, the image density control is executed for every 2,400 sheets in the Type 3 like Table 3. In the present modified example, the Type 1 and the Type 3 differ not only in a toner filling amount but also in the surface layer material of a photosensitive drum 1. That is, the Type 1 has a photosensitive drum 1 having a surface layer made of a material that easily wears, and the Type 3 has a photosensitive drum 1 having a surface layer made of a material that hardly wears. The cartridge of the Type 3 has a greater toner filling amount, and has the photosensitive drum 1 that hardly wears. Therefore, a reduction in a drum potential after charging becomes slower than the Type 1. As a result, a change in the curved line γ also becomes slower. In a case where the Type 1 and the Type 3 coexist, the image density control is executed at both the timing when 1,000 sheets have been printed for the Type 1 and the timing when 2,400 sheets have been printed for the Type 3. Thus, the execution frequency of the image density control is increased, thereby making it possible to reproduce more accurate tinges.

Note that the difference between the photosensitive drums 1 may not be a difference in the materials of their surface layers but may be a difference in the film thickness of the surface layers or susceptibility to light degradation. In any case, the present embodiment is applicable so long as the transition speed of the curved line γ varies. Further, the image density control is periodically executed in the present embodiment but may be non-periodically executed according to the timing when the curved line transitions to the curved line γ2. Further, an execution timing may be determined using tag information stored in the process cartridges.

Third Modified Example

In a third modified example as well, the cartridge of the Type 1 and the cartridge of the Type 3 having a nominal lifespan of 50,000 sheets are employed. As for the transition of the curved line γ as well, the image density control is executed for every 2,400 sheets in the Type 3 like Table 3. In the present modified example, the Type 1 and the Type 3 differ not only in a toner filling amount but also in a developing roller 17. That is, a developing roller 17 of the Type 3 has lower hardness than that of the Type 3. The cartridge of the Type 3 has a greater toner filling amount, and has the developing roller 17 having lower hardness. Therefore, degradation of developing roller filming is reduced. As a result, the transition of the curved line γ becomes slower compared to the Type 1.

In a case where the Type 1 and the Type 3 coexist like the present embodiment, the image density control is executed at both the timing when 1,000 sheets have been printed for the Type 1 and the timing when 2,400 sheets have been printed for the Type 3. Thus, the execution frequency of the image density control is increased, thereby making it possible to reproduce more accurate tinges.

Further, the image density control is periodically executed in the present embodiment but may be non-periodically executed according to the timing when the curved line transitions to the curved line γ2. Further, an execution timing may be determined using tag information stored in the process cartridges. As described in the above modified example, the nominal lifespans of the cartridges are also determined by elements such as materials, structures, or the like of respective members other than toner filling amounts. However, in any case, it is possible to accurately reproduce color tinges by executing the image density control at a timing suited to each of the cartridges having different lifespans.

Third Embodiment

A third embodiment will describe a case where only an image density control timing in a cartridge having the shortest nominal lifespan among a plurality of process cartridges is used as a trigger for executing image density control.

Figure 14:
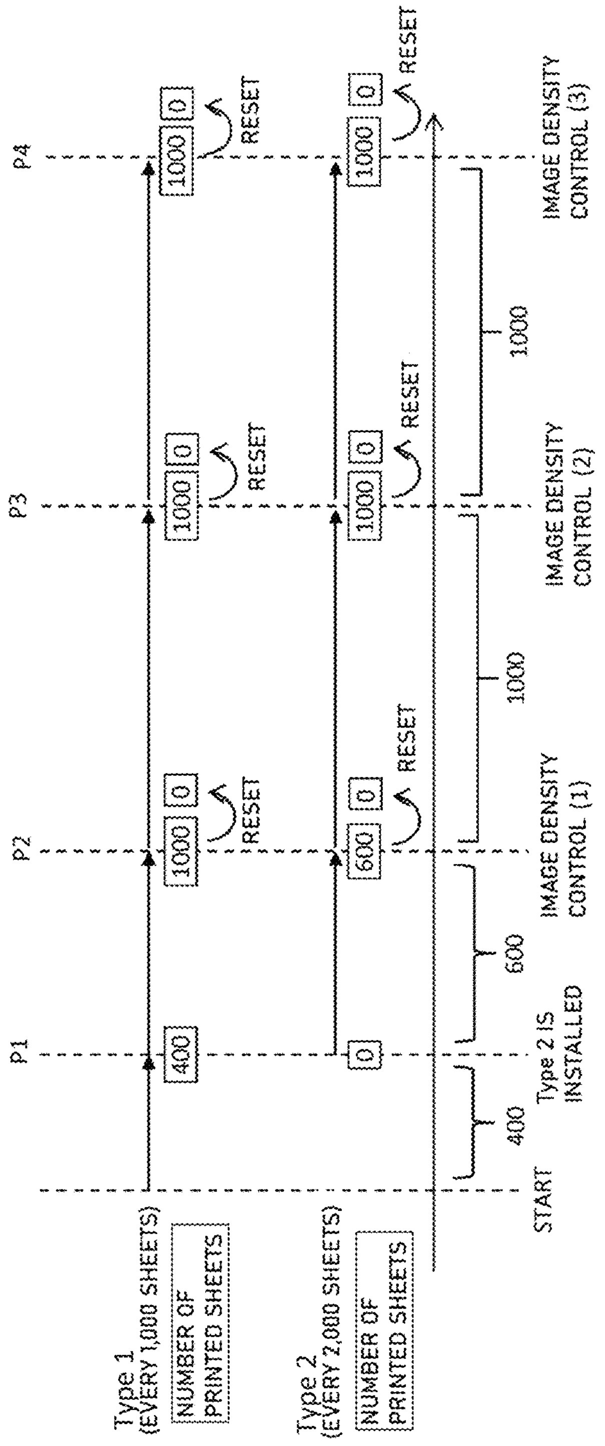
FIG. 14 is a timing chart showing an example of image density control of a third embodiment.

An example of the control of the present embodiment will be described with reference to FIG. 14. The same symbols as those shown in FIG. 11 are used. In FIG. 14, numbers surrounded by frames in each of a Type 1 and a Type 2 show the number of printed sheets since calibration (or installation) at the last time. The numbers are reset to zero for every 1,000 sheets in the case of the Type 1, and reset to zero for every 2,000 sheets in the case of the Type 2. It is assumed that the Type 2 that is brand new is installed at a timing P1 when 400 sheets have been printed since a start. In this case, as the number of printed sheets of the Type 1 reaches 1,000 sheets at a timing P2 when 600 sheets have been printed since the installation of the Type 2, the image density control is executed for the first time. In the present embodiment, the number of printed sheets is reset also for the Type 2.

Subsequently, as the number of printed sheets after reset of the Type 1 reaches 1,000 sheets at a timing P3 when 1,000 sheets have been printed since the timing P2, the image density control is executed for the second time. In the present embodiment, the number of printed sheets is reset also for the Type 2. Subsequently, at a timing P4 when 1,000 sheets have been printed since the timing P3, the image density control is executed for the third time.

In the present embodiment, only an image density control timing related to the Type 1 that has the smallest number of printed sheets until reset among the process cartridges installed in an image forming apparatus 100 serves as a trigger. That is, in the present embodiment, the number of counted sheets of the Type 2 does not reach 2,000 sheets. In this control, calibration is executed according to the shortest cycle, and therefore a sufficient number of calibration times is achieved. In addition, the number of calibration times does not become excessive in the present embodiment.

Fourth Embodiment

Next, a fourth embodiment of the present invention will be described. Note that descriptions will be omitted for parts overlapping with the above embodiments. The present embodiment differs from the above embodiments in an image density control method.

In the above embodiments, the toner patches are formed on the intermediate transfer belt, and then adjustment of image density or gradation is executed using results obtained by measuring the toner patches with the density sensor 41. Conversely, a controller 72 of the present embodiment acquires computation parameters for image density control stored in advance in a ROM 74 of an image forming apparatus 100, and then executes adjustment of image density or gradation using the computation parameters. The computation parameters are calculated by performing machine learning using temperature and humidity information, the number of printed sheets, cartridge lifespan information, toner amounts inside cartridges and member information (types of charging rollers and developing rollers), or the like at the development stage of a product.

By executing image density control using the computation parameters, a series of operation times such as patch formation on an intermediate transfer belt and measurement with a density sensor are eliminated, and the image density control is completed using only a computation processing time.

By this method, it is possible to maintain high tinge reproduction without increasing downtime for a user even if the execution frequency of the image density control becomes high in a case where process cartridges having different lifespans coexist in the same image forming apparatus.

As described above, according to the methods of the respective embodiments, it is possible to provide an image forming apparatus capable of executing accurate tinge adjustment even in a case where process cartridges having different lifespan settings are installed in the same image forming apparatus. That is, when respective cartridges having different lifespans are installed in the same image forming apparatus, executing image density control corresponding to the respective lifespans increases a calibration frequency, thereby enabling the maintenance of tinge reproduction. Note that the respective embodiments describe cases where the lifespans of two types are set. However, the number of lifespans set is not limited to this. Even in a case where cartridges having the lifespans of at least three types coexist, it is possible to maintain tinge reproduction by executing calibration corresponding to the respective lifespans. Note that configurations causing a factor for different cartridge lifespans differ between the respective embodiments, but any combination of these configurations is possible in actual cartridges.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-099180, filed on Jun. 16, 2023, which is hereby incorporated by reference wherein herein in its entirety.

What is claimed is:

1. An image forming apparatus comprising:

a plurality of cartridges each having an image bearing member, a developer bearing member, and an accommodation chamber, the image bearing member being exposed on a basis of image data to have an electrostatic latent image formed on a surface thereof, the developer bearing member developing the electrostatic latent image with developer to form a developer image, the accommodation chamber accommodating the developer;

an intermediate transfer member onto which the developer images formed by the plurality of cartridges are transferred;

a detection unit for applying light to the developer images transferred onto the intermediate transfer member and detecting reflected light and outputting information related to the reflected light; and a control unit, wherein the plurality of cartridges is able to be simultaneously installed in the image forming apparatus, each of the plurality of cartridges has an available lifespan, and the control unit is configured to:

execute image density control to control image density for forming the developer images on a basis of a value of the image data and the information related to the reflected light, and increase, in a case where a first cartridge having a first lifespan and a second cartridge having a second lifespan different from the first lifespan are simultaneously installed in the image forming apparatus, execution frequency of the image density control relative to that in a case where only the second cartridge is installed.

2. The image forming apparatus according to claim 1, wherein the control unit is configured to execute, in a case where the first cartridge and the second cartridge are simultaneously installed in the image forming apparatus, the image density control at both a first frequency determined to execute the image density control for the first cartridge and a second frequency determined to execute the image density control for the second cartridge.

3. The image forming apparatus according to claim 2, wherein an execution frequency of the image density control is determined on a basis of a number of printed sheets of a recording material in the image forming apparatus.

4. The image forming apparatus according to claim 2, wherein the control unit is configured to execute the image density control when a change in gradation characteristics for forming the developer images in accordance with an increase in a number of printed sheets of a recording material in the image forming apparatus exceeds a prescribed allowable range.

5. The image forming apparatus according to claim 2, wherein the first frequency is determined on a basis of the first lifespan of the first cartridge, and the second frequency is determined on a basis of the second lifespan of the second cartridge.

6. The image forming apparatus according to claim 1, wherein a first frequency determined to execute the image density control is set in the first cartridge, a second frequency determined to execute the image density control is set in the second cartridge, and the control unit is configured to execute, in a case where the first cartridge and the second cartridge are simultaneously installed in the image forming apparatus, the image density control at the first frequency when a cycle of the first frequency is shorter than a cycle of the second frequency.

7. The image forming apparatus according to claim 1, wherein the first cartridge and the second cartridge have different lifespans on a basis of a difference therebetween in terms of an amount of the developer accommodated in the accommodation chamber.

8. The image forming apparatus according to claim 1, wherein the plurality of cartridges each have a charging unit for charging the image bearing member, and the first cartridge and the second cartridge have different lifespans on a basis of a difference therebetween in terms of at least one of roughness and hardness of the charging unit.

9. The image forming apparatus according to claim 1, wherein the plurality of cartridges each have a charging unit for charging the image bearing member, and the first cartridge and the second cartridge have different lifespans on a basis of a difference therebetween in terms of a layer structure of the charging unit.

10. The image forming apparatus according to claim 1, wherein the first cartridge and the second cartridge have different lifespans on a basis of a difference therebetween in terms of at least one of a material of a surface layer of the image bearing member, a film thickness of the surface layer, and susceptibility to light gradation of the surface layer.

11. The image forming apparatus according to claim 1, wherein the first cartridge and the second cartridge have different lifespans on a basis of a difference therebetween in terms of at least one of roughness and hardness of the developer bearing member.

12. The image forming apparatus according to claim 1, wherein the lifespans of the cartridges correspond to a number of printed sheets.

13. The image forming apparatus according to claim 1, wherein the lifespans of the cartridges are expressed by units based on used hours of the cartridges.

14. The image forming apparatus according to claim 1, wherein the plurality of cartridges each have a memory configured to store information related to determination of execution frequency of the image density control.

15. The image forming apparatus according to claim 1, wherein the control unit is configured to:

acquire image density of the developer images on a basis of intensity information of the reflected light, acquire gradation characteristics for forming the developer images on a basis of the value of the image data and the image density, and execute the image density control such that the gradation characteristics become targeted gradation characteristics.

16. An image forming apparatus comprising:

a plurality of cartridges each having an image bearing member, a developer bearing member, and an accommodation chamber, the image bearing member being exposed on a basis of image data so as to have an electrostatic latent image formed on a surface thereof, the developer bearing member developing the electrostatic latent image with developer so as to form a developer image, the accommodation chamber accommodating the developer;

an intermediate transfer member onto which the developer images formed by the plurality of cartridges are transferred;

a detection unit for applying light to the developer images transferred onto the intermediate transfer member and detecting reflected light and outputting information related to the reflected light; and a control unit, wherein the plurality of cartridges is attachable and detachable to the image forming apparatus, each of the plurality of cartridges has an available lifespan, and the control unit is configured to:

execute image density control to control image density for forming the developer images on a basis of a value of the image data and the information related to the reflected light, and execute, in a case where a first cartridge having a first lifespan and a second cartridge having a second lifespan different from the first lifespan are simultaneously installed in the image forming apparatus, the image density control at both a first frequency determined to execute the image density control for the first cartridge and a second frequency determined to execute the image density control for the second cartridge.

* * * * *